July 14, 1936.  M. KERZAK  2,047,875
AUTOMATIC STEERING DEVICE
Filed June 20, 1933  2 Sheets-Sheet 1
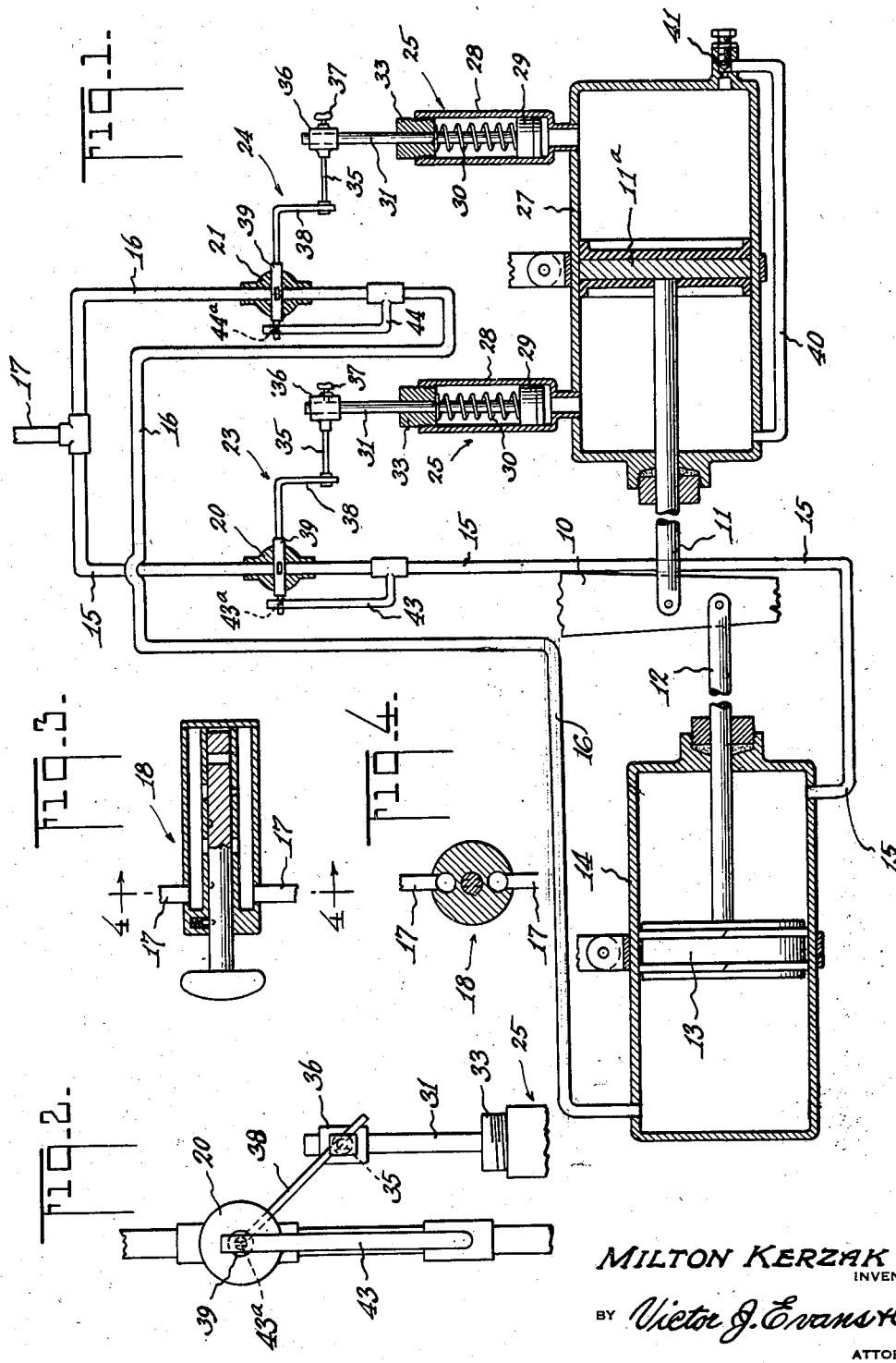
MILTON KERZAK
INVENTOR
BY *Victor J. Evans & Co.*
ATTORNEY

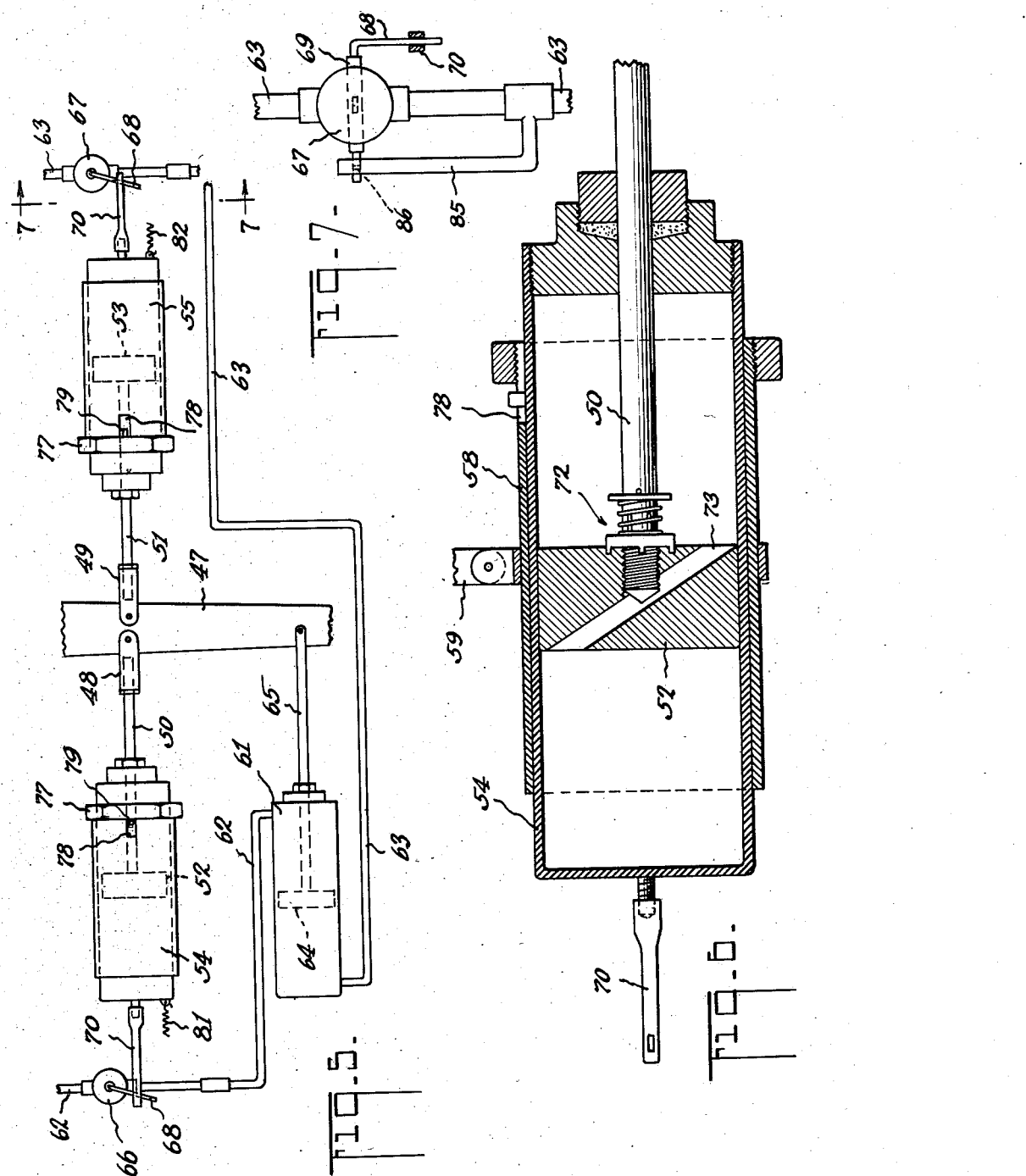

Patented July 14, 1936

2,047,875

UNITED STATES PATENT OFFICE 2,047,875

AUTOMATIC STEERING DEVICE

Milton Kerzak, New York, N. Y.

Application June 20, 1933, Serial No. 676,766

5 Claims. (Cl. 180—79.2)

This invention relates to apparatus employed in the steering of vehicles.

It is well known that effort is required to operate the steering wheel of a vehicle in turning or shifting the same from a straight course. The apparatus of my invention assists the driver in steering, and is of especial advantage in the steering of heavy vehicles.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therein as do not affect the spirit of the invention nor exceed the scope thereof as expressed in the appended claims.

In the drawings:

Fig. 1 is a view partly diagrammatic and partly in section showing one embodiment of my invention.

Fig. 2 is an enlarged view showing part of the apparatus of Fig. 1.

Fig. 3 is a view showing a regulating valve employed in connection with the apparatus shown in Fig. 1.

Fig. 4 is a section taken on line 4—4 of Fig. 3.

Fig. 5 is a view showing another form of my invention.

Fig. 6 is a detailed sectional view of one of the two hydraulic cylinders shown in Fig. 5; and Fig. 7 is a view taken on line 7—7 of Fig. 5.

Referring to the drawings for a more detailed description thereof and at first to Figs. 1 to 4, inclusive, the numeral 10 indicates a steering arm adapted to be moved by the turning of the steering wheel of the truck or other vehicle.

To said steering arm are pivotally connected oppositely directed piston rods 11 and 12, respectively. The piston rod 12 is connected to a piston 13 which works in a cylinder 14. Pipes 15 and 16 are connected into opposite ends of said cylinder on opposite sides of the piston 13. Said pipes 15 and 16 are connected to a pipe 17 which leads to a source of elastic fluid pressure. The valve 18, positioned on the dashboard of the vehicle, shown in Fig. 3, is preferably connected into the pipe 17 to regulate the flow of air thru the pipes 15 and 16. While Fig. 3 shows one form of valve to be used in the position and for the purpose mentioned, it is to be understood that any suitable type of valve may be used. Valves 20 and 21, which are normally closed, are connected in pipes 15 and 16, respectively. Means are provided and hereinafter described for opening one of said valves 20 or 21, while the other remains closed. Said means comprises apparatus designated by the numerals 23 and 24, which are of similar construction, each being connected to one of the mentioned valves. The devices 23 and 24 each include a piston valve 25 which is connected into the hydraulic cylinder 27 at opposite sides of the piston 11a which is connected to the piston rod 11. Each of said piston valves 25 includes a cylinder 28 within which works a piston 29, normally held seated on the bottom of the cylinder by a spring 30 coiled around a piston rod 31 which slidably passes thru a plug 33 screwed into the cylinder 28. Arms 35 are adjustably mounted on the piston rods 31 by means of sleeves 36 having set screws 37. Said arms 35 are pivotally connected to cranks 38 which are joined to stems 39 which pass thru and are adapted to turn the plugs of the valves 20 and 21.

A by-pass pipe 40 has its ends connected into the hydraulic cylinder 27 on opposite sides of the piston 11a and is provided to allow part of the liquid displaced by the movement of the piston 11a to flow from one side of the piston to the other, a valve 41 being provided adjacent one end of the cylinder to regulate the rate of flow of liquid thru said pipe.

Exhaust tubes 43 and 44, thru which also air is admitted to cylinder 14, are connected in the pipes 15 and 16 respectively and outlet or exhaust valves 43a and 44a are respectively connected into the exhaust tubes 43 and 44. Said valves 43a and 44a are normally open, that is to say, they are open when the valves 20 and 21 are both closed, said valve 43a being automatically closed when the valve 20 is opened and said valve 44a being automatically closed when the valve 21 is opened, said means 23 and 24 which automatically open and close the valves 20 and 21, respectively, being also the means for automatically opening and closing the valves 43a and 44a, it being understood that the stems of said valves 43a and 44a are connected to the stems of the valves 20 and 21, respectively.

When the vehicle is moved in a straight course, the position of the parts is as shown in Figure 1 of the drawings, the inelastic fluid with which the cylinder 27 is charged being on opposite sides of the piston 11a and the elastic fluid, previously admitted to the cylinder 14, exhausted therefrom. But the pressure at which the elastic fluid is admitted is never sufficient to overcome the total resistance to movement of the steering arm 10, although approximating that necessary. The force supplied to the steering wheel by the operator supplies the additional increment necessary to effect movement of the steering arm 10, assuming the steering mechanism to be operated so that the arm 10 will be swung to the right as viewed in Figure 1 of the drawings. This will result in the slight movement of the piston 11a to the right and the ejection of the contents of the cylinder 27 on the right side of the piston 11a partly into the cylinder 28 of the righthand piston valve 25, thus resulting in the opening of the valve 21 and the closing of the valve 44a. The fluid will also be ejected through the by-pass 49 to the opposite side of the piston 11a. A comparatively small movement of the arm 10 is always necessary to bring about this condition, but immediately upon opening the valve 21 and the closing of the attendant exhaust valve 44a, elastic fluid is admitted through the pipe 16 into the lefthand of the cylinder 14, thereby applying a pressure on the piston 13 to move the latter to the right, so that the only force necessary to be applied by the operator is the excess over that applied by the piston 13. As long as the operator applies this excess force, a part of the fluid to the right of the piston 11a is forced into the cylinder 28, so that the valve 21 is kept in open position, but on the cessation of the force applied by the operator, the mechanism comes to rest because the pressure on the piston 13 is insufficient to continue the movement of the arm 10. The spring 30 in the righthand cylinder 28 then becomes active to force the fluid out of the cylinder 28 and back into the cylinder 27, so that the valve 21 is closed and cuts off the supply of elastic fluid to the cylinder 14, at the same time opening the exhaust valve 44a, so that the previously admitted elastic fluid may be exhausted from the cylinder 14. In steering to move arm 10 to the left, the lefthand piston valve 25 is brought into operation to open the valve 20 and close the valve 43a, the piston 11a being then moved toward the left and the elastic fluid pressure admitted to the righthand end of the cylinder 14. At any time the operator ceases to apply a turning force to the steering wheel, therefore, the apparatus becomes inoperative, being set into operation by an initial turning movement imparted by the operator, after which it is only necessary for him to supply that increment of force, which, together with the force applied to the piston 13, is necessary to effect movement of the arm 10.

Referring now to Figs. 5, 6, and 7, which show a modification of my invention, steering arm 47, which corresponds to the steering arm 10 shown in Fig. 1, has oppositely directed members 48 and 49 pivotally connected to it. Piston rods 50 and 51 are respectively connected to the members 48 and 49 and said piston rods are connected respectively to pistons 52 and 53 which work in hydraulic cylinders 54 and 55, respectively. The cylinders 54 and 55 are similarly constructed and the details are shown in Fig. 6. The cylinders are slidably mounted in supports 58 which are connected to straps 59, the latter being attached to the chassis of the truck. A cylinder 61 is adapted to be supplied with air under pressure thru pipes 62 and 63, which are connected into the cylinder adjacent its ends and on opposite sides of a piston 64 which has a piston rod 65 pivotally connected to the steering arm 47. Valves 66 and 67 are respectively connected into the pipes 62 and 63, which are normally closed. Means are provided for opening said valves, one at a time depending on the direction in which steering arm 47 is moved by the turning of the steering wheel. Said means comprise cranks 68 secured to the stems 69 of the valves 66 and 67. Said cranks 68 are pivotally connected to links 70 which are secured to the outer ends of the cylinders 54 and 55, respectively.

When the steering arm 47 moves to the right, the piston rod 51 and its piston 53 are moved to the right, resulting in the opening of valve 67, the closing of the associated valve 86 and the flow of air thru pipe 63 into the cylinder 61; the piston 64, its rod 65 and the steering arm 47 are thus moved to the right. Thus it will be seen that the apparatus assists the driver in steering. When the steering arm moves to the left due to the turning of the steering wheel by the driver, the piston rod 50 and its piston 52 are moved to the left, resulting in the opening of valve 66 and the flow of air thru pipe 62 from the cylinder 61; the piston 64 and its rod 65 are thus moved to the left and the steering arm 47 is moved therewith. The opening of the valves 66 and 67 in the present construction is possible due to the fact that the cylinders 54 and 55 are slidably mounted in the supports 58, it being understood that the cylinders 54 and 55 slide in said supports when their respective pistons are moved, due to the fact that the resistance of the fluid to the movement of the respective pistons is such that the cylinders move. The resistance offered by the liquid to the movement of the pistons is regulated by valves 72 which are adjustable in the oblique passageways 73 which are formed in the pistons 52 and 53 to allow the liquid to pass from one side of each piston to the other. Said supports 58 are provided at one end with flanges 77 adjacent which are slots 78 in which move pins 79 when the cylinders 54 and 55 are moved, the pins 79 being secured to said cylinders and limiting the movement of said cylinders between the inner ends of the slots 78 and the flanges 77. Coiled springs 81 and 82 are connected respectively to the outer ends of cylinders 54 and 55 and are to be attached at their other ends to stationary members and are provided to return said cylinders to their normal positions after movement which is effective in opening the valves 66 and 67.

Exhaust tubes 85 are connected into the pipes 62 and 63, as shown in Fig. 7, and each of these exhaust tubes contains a valve 86, the plug of which is connected to the stems of the valves 66 and 67, respectively, it being understood that the valves 86 are open when the associated valve is closed and vice versa, and that they are provided to allow air to escape from the cylinder 61 by way of pipes 62 and 63, respectively.

The same principle of operation is involved in the modification illustrated in Figures 5 to 7 as is involved in the form illustrated in Figure 1, the control valves (either 66 or 67) being held in open position only when the operator applies the additional force necessary over that applied by the piston 64 to effect movement of the arm 47.

What is claimed is:

1. Vehicle steering apparatus comprising a steering arm movable by the turning of the steering wheel of a vehicle, oppositely directed piston rods pivoted to said arm, cylinders, pistons in said cylinders and connected to said rods, pipes connected to one of said cylinders on opposite sides of the piston therein and adapted to be connected to a source of elastic fluid pressure, a normally closed valve in each of said pipes, and means actuated upon movement of the piston in the second of said cylinders and connected to each of said valves to open either one of the latter, depending on the direction of movement of the piston, where the other valve remains closed.

2. Vehicle steering apparatus comprising a steering arm movable by the turning of the steering wheel of a vehicle, oppositely directed piston rods pivoted to said arm, cylinders, pistons in said cylinders and connected to said rods, pipes connected to one of said cylinders on opposite sides of the piston therein and adapted to be connected to a source of elastic fluid pressure, a normally closed valve in each of said pipes, and means actuated upon movement of the piston in the second of said cylinders and connected to each of said valves to open either one of the latter, depending on the direction of movement of the piston, where the other valve remains closed, exhaust tubes connected to said pipes, outlet valves in said tubes, said means being adapted to close an outlet valve as it opens the corresponding inlet valve and vice versa.

3. Vehicle steering apparatus comprising a steering arm movable by the turning of the steering wheel of a vehicle, oppositely directed piston rods pivoted to said arm, cylinders, pistons in said cylinders and connected to said rods, pipes connected to one of said cylinders on opposite sides of the piston therein and adapted to be connected to a source of elastic fluid pressure, a normally closed valve in each of said pipes, and means actuated upon movement of the piston in the second of said cylinders and connected to each of said valves to open either one of the latter, depending on the direction of movement of the piston, where the other valve remains closed, and a pipe having its ends connected into said second cylinder on opposite sides of the piston therein.

4. Vehicle steering apparatus comprising a steering arm movable by the turning of the steering wheel of a vehicle, oppositely directed piston rods pivoted to said arm, cylinders, pistons in said cylinders and connected to said rods, pipes connected to one of said cylinders on opposite sides of the piston therein and adapted to be connected to a source of elastic fluid pressure, a normally closed valve in each of said pipes, means actuated upon movement of the piston in the second of said cylinders and connected to each of said valves to open either one of the latter, depending on the direction of movement of the piston, where the other valve remains closed, said means comprising third and fourth cylinders opening into said second cylinder, one on each side of the piston in the second cylinder, resiliently mounted pistons in said third and fourth cylinders, piston rods for the pistons in the third and fourth cylinders and cranks connected to the last mentioned pistons and to said valves.

5. Vehicle steering apparatus comprising a steering arm movable by the turning of the steering wheel of a vehicle, oppositely directed piston rods pivoted to said arm, cylinders, pistons in said cylinders and connected to said rods, pipes connected to one of said cylinders on opposite sides of the piston therein and adapted to be connected to a source of elastic fluid pressure, a valve in each of said pipes and means actuated by movement of the piston in the second of said cylinders for opening and closing said valves.

MILTON KERZAK.